United States Patent
Lee et al.

(10) Patent No.: US 9,130,735 B2
(45) Date of Patent: Sep. 8, 2015

(54) MULTI-PHASE CLOCK GENERATION METHOD

(71) Applicant: QUALCOMM Incorporated, San Diego, CA (US)

(72) Inventors: Chulkyu Lee, San Diego, CA (US); George Alan Wiley, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/336,977

(22) Filed: Jul. 21, 2014

(65) Prior Publication Data

US 2015/0023454 A1    Jan. 22, 2015

Related U.S. Application Data (60) Provisional application No. 61/857,212, filed on Jul. 22, 2013.

(51) Int. Cl.
*H04B 3/50* (2006.01)
*H04L 7/00* (2006.01)
*H04L 7/033* (2006.01)
*G06F 13/42* (2006.01)

(52) U.S. Cl.
CPC ............ *H04L 7/033* (2013.01); *G06F 13/4295* (2013.01); *H04B 3/50* (2013.01); *H04L 7/0041* (2013.01)

(58) Field of Classification Search
CPC .......... H04B 3/02; H04B 3/50; H04L 7/0041; H04L 7/033; H04L 7/0079
USPC ................. 375/257, 288, 316, 355, 360, 371
See application file for complete search history.

(56) References Cited

U.S. PATENT DOCUMENTS

| | | | | |
|---|---|---|---|---|
| 3,992,581 A | * | 11/1976 | Davis | 178/70 R |
| 4,419,760 A | * | 12/1983 | Bjornholt | 375/376 |
| 7,512,848 B1 | | 3/2009 | Abughazaleh | |
| 8,565,362 B2 | | 10/2013 | Kim | |
| 8,649,460 B2 | | 2/2014 | Ware et al. | |
| 2009/0092212 A1 | * | 4/2009 | Ko | 375/360 |
| 2009/0274254 A1 | * | 11/2009 | Hirata | 375/371 |
| 2014/0010276 A1 | | 1/2014 | Hsu et al. | |
| 2014/0118041 A1 | | 5/2014 | Ma | |
| 2014/0153665 A1 | | 6/2014 | Wiley et al. | |

FOREIGN PATENT DOCUMENTS

GB    2453185 A    4/2009

OTHER PUBLICATIONS

International Search Report and Written Opinion—PCT/US2014/047586—ISA/EPO—Oct. 22, 2014.

* cited by examiner

*Primary Examiner* — Betsy Deppe
(74) *Attorney, Agent, or Firm* — Novak Druce Connolly Bove + Quigg LLP (57) ABSTRACT

Systems and methods for multi-phase signaling are described herein. In one embodiment, a method for receiving data comprises receiving a sequence of symbols from a plurality of conductors, and generating a clock signal by detecting transitions in the received sequence of symbols. The method also comprises delaying the received sequence of symbols, and capturing one or more symbols in the delayed sequence of symbols using the clock signal, wherein a previous symbol in the delayed sequence of symbols is captured using a clock pulse in the clock signal generated based on a detected transition to a current symbol in the received sequence of symbols.

25 Claims, 11 Drawing Sheets

MULTI-PHASE CLOCK GENERATION METHOD

RELATED APPLICATION

This application claims priority under 35 U.S.C. §119(e) to U.S. Provisional Application No. 61/857,212 filed on Jul. 22, 2013, the entire specification of which is incorporated herein by reference.

BACKGROUND

1. Field

The present disclosure relates generally to data communication, and more particularly, to multi-phase signaling.

2. Background

High frequency signals are often transmitted using differential interfaces to provide common-mode rejection for critical signals. In devices such as memory devices, which transmit and receive large amounts of data, interfaces may be expensive and may consume significant power.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method for receiving data is described herein. The method comprises receiving a sequence of symbols from a plurality of conductors, and generating a clock signal by detecting transitions in the received sequence of symbols. The method also comprises delaying the received sequence of symbols, and capturing one or more symbols in the delayed sequence of symbols using the clock signal, wherein a previous symbol in the delayed sequence of symbols is captured using a clock pulse in the clock signal generated based on a detected transition to a current symbol in the received sequence of symbols.

A second aspect relates to an apparatus for receiving data. The apparatus comprises means for receiving a sequence of symbols from a plurality of conductors, and means for generating a clock signal by detecting transitions in the received sequence of symbols. The apparatus also comprises means for delaying the received sequence of symbols, and means for capturing one or more symbols in the delayed sequence of symbols using the clock signal, wherein a previous symbol in the delayed sequence of symbols is captured using a clock pulse in the clock signal generated based on a detected transition to a current symbol in the received sequence of symbols.

A third aspect relates to a receiving system. The receiving system comprises a receiver circuit configured to receive a sequence of symbols from a plurality of conductors, and a clock recovery circuit configured to generate a clock signal by detecting transitions in the received sequence of symbols. The receiving system also comprises a delay circuit configured to delay the received sequence of symbols, and a flip-flop configured to capture one or more symbols in the delayed sequence of symbols using the clock signal, wherein the flip-flop captures a previous symbol in the delayed sequence of symbols using a clock pulse in the clock signal generated based on a detected transition to a current symbol in the received sequence of symbols.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

FIGS. 1A-1F show an exemplary 3-phase communication system 100 configured to be driven into six different states. The 3-phase communication system 100 comprises three wires labeled A, B and C. Each wire may comprise a conductive trace on a circuit board, a conductive trace on an integrated circuit (IC), a transmission line, or other type of conductor. The 3-phase communication system 100 also comprises three drivers 110A-110C. Each wire A, B and C is coupled at one end to a respective one of the drivers 110A-110C and at the other end to a respective termination resistor (denoted Rterm). Each termination resistor is coupled at one end to the respective wire and at the other end to a common node (denoted comm). Each termination resistors may have equal resistance. In the example shown in FIGS. 1A-1F, each termination resistor has a resistance of approximately 50Ω, and each wire A, B and C has a characteristic impedance of 50Ω.

In one embodiment, each driver 110A-110C comprises a pull-up n-type field effect transistor (NFET) 115A-115C, a pull-up resistor 120A-120C, a pull-down resistor 125A-125C, and a pull-down NFET 130A-130C. For each driver 110A-110C, the respective wire A, B and C is coupled between the pull-up resistor 120A-120C and the pull-down resistor 125A-125C. The series combination of each pull-up resistor 120A-120C and the respective pull-up NFET 115A-115C may have a resistance approximately equal to the resistance of the respective termination resistor (50Ω in the example shown in FIGS. 1A-1F). Similarly, the series combination of each pull-down resistor 125A-125C and the respective pull-down NFET 130A-130C may have a resistance approximately equal to the resistance of the respective termination resistor (50Ω in the example shown in FIGS. 1A-1F).

Each driver 110A-110C may be configured to drive the respective wire A, B and C with a positive flowing current (denote I) or a negative flowing current (denote −I), or leave the respective wire A, B and C undriven. To drive the respective wire A, B and C with positive current I, the pull-up NFET 115A-115C is turned on and the pull-down NFET 130A-130C is turned off. This allows current to flow from the power supply to the respective wire A, B and C through the pull-up NFET 115A-115C and the pull-up resistor 120A-120C. To drive the respective wire A, B and C with negative current −I, the pull-up NFET 115A-115C is turned off and the pull-down NFET 130A-130C is turned on. This allows current to flow from the respective wire A, B and C to ground though the pull-down resistor 125A-125C and the pull-down NFET 130A-130C. To leave the respective wire A, B and C undriven, both the pull-up NFET 115A-115C and the pull-down NFET 130A-130C are turned off. As a result, approximately no current flows though the respective wire A, B and C. The pull-up NFET 115A-115C may be turned on by inputting a logic one (e.g., supply voltage) to the respective gate 117A-117C and turned off by inputting a logic zero (e.g., ground) to the respective gate 117A-117C, and the pull-down NFET 130A-130C may be turned on by inputting a logic one (e.g., supply voltage) to the respective gate 132A-132C and turned off by inputting a logic zero (e.g., ground) to the respective gate 132A-132C.

In one embodiment, the drivers 110A-110C are controlled such that, at a given time, only two of the wires A, B and C are driven while the other wire A, B and C is undriven. In addition, the two wires that are driven are driven with opposite polarity. For example, if wires A and B are driven, then wire A may be driven with positive current I and wire B may be driven with negative current −I, or vice versa. In this example, wire C is undriven.

In this embodiment, there are three different possible pairs of wires that can be driven simultaneously: wires A and B, wires B and C, and wires A and C. Each of these pairs may be referred to as a phase state. For each phase state, there are two possible polarities. For example, if wires A and B are driven, then wire A may be positively driven and wire B negatively driven, or wire A may be negatively driven and wire B positively driven. Thus, the three wires A, B and C may have three different phase states with two different polarities for each phase state, resulting in a total of six possible states. The six possible states are illustrated in FIGS. 1A-1F, as discussed further below.

Figure 1A:
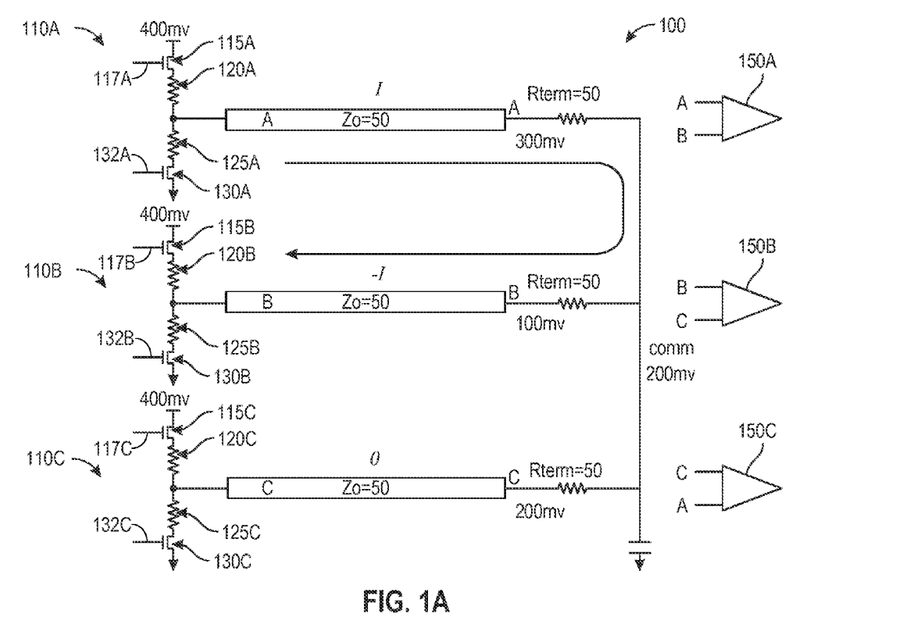
FIGS. 1A-1F show an exemplary 3-phase communication system driven into six different states.

FIG. 1A shows a first state in which wires A and B are driven with wire C undriven, and wire A is positively driven and wire B is negatively driven. As a result, current flows from the transmitter side to the receiver side through wire A and returns to the transmitter side through wire B (represented by the current loop in FIG. 1A). Approximately no current flows through wire C.

Figure 1B:
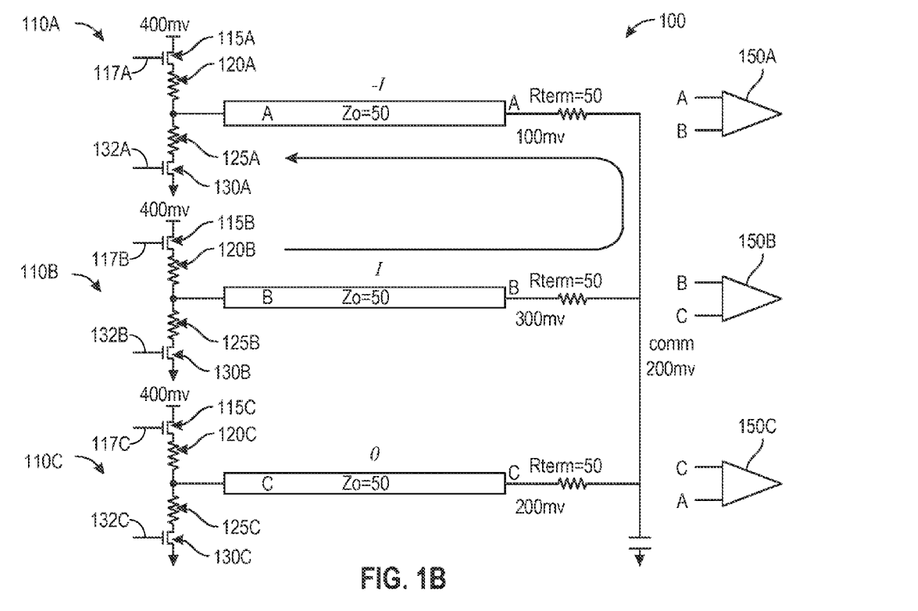

FIG. 1B shows a second state in which wires A and B are driven with wire C undriven, and wire B is positively driven and wire A is negatively driven. As a result, current flows from the transmitter side to the receiver side through wire B and returns to the transmitter side through wire A (represented by the current loop in FIG. 1B). Approximately no current flows through wire C.

Figure 1C:
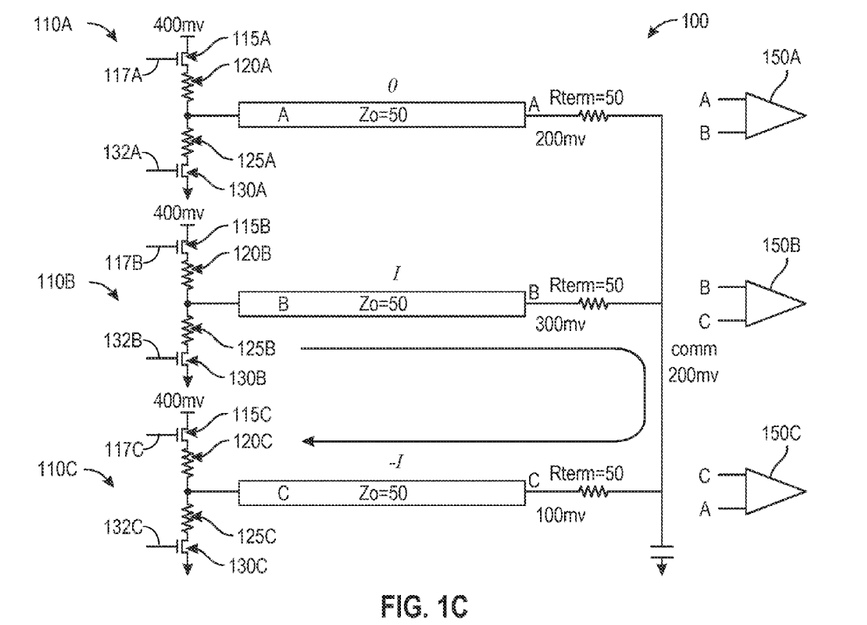

FIG. 1C shows a third state in which wires B and C are driven with wire A undriven, and wire B is positively driven and wire C is negatively driven. As a result, current flows from the transmitter side to the receiver side through wire B and returns to the transmitter side through wire C (represented by the current loop in FIG. 1C). Approximately no current flows through wire A.

Figure 1D:
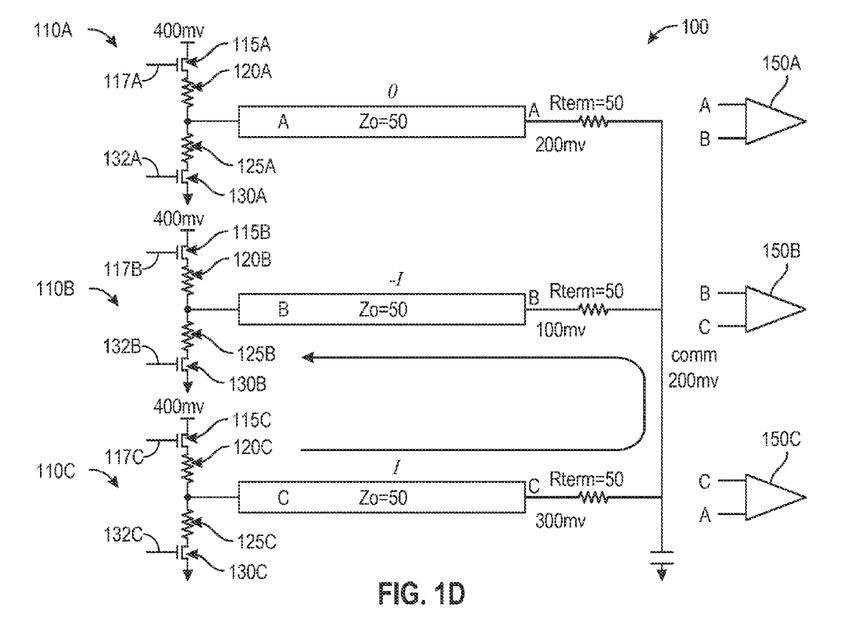

FIG. 1D shows a fourth state in which wires B and C are driven with wire A undriven, and wire C is positively driven and wire B is negatively driven. As a result, current flows from the transmitter side to the receiver side through wire C and returns to the transmitter side through wire B (represented by the current loop in FIG. 1D). Approximately no current flows through wire A.

Figure 1E:
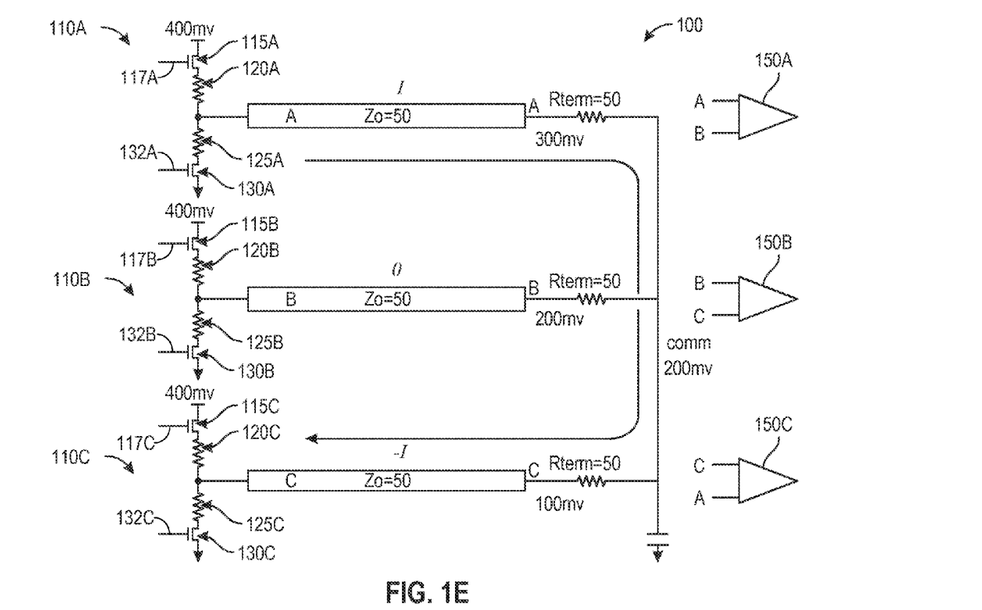

FIG. 1E shows a fifth state in which wires A and C are driven with wire B undriven, and wire A is positively driven and wire C is negatively driven. As a result, current flows from the transmitter side to the receiver side through wire A and returns to the transmitter side through wire C (represented by the current loop in FIG. 1E). Approximately no current flows through wire B.

Figure 1F:
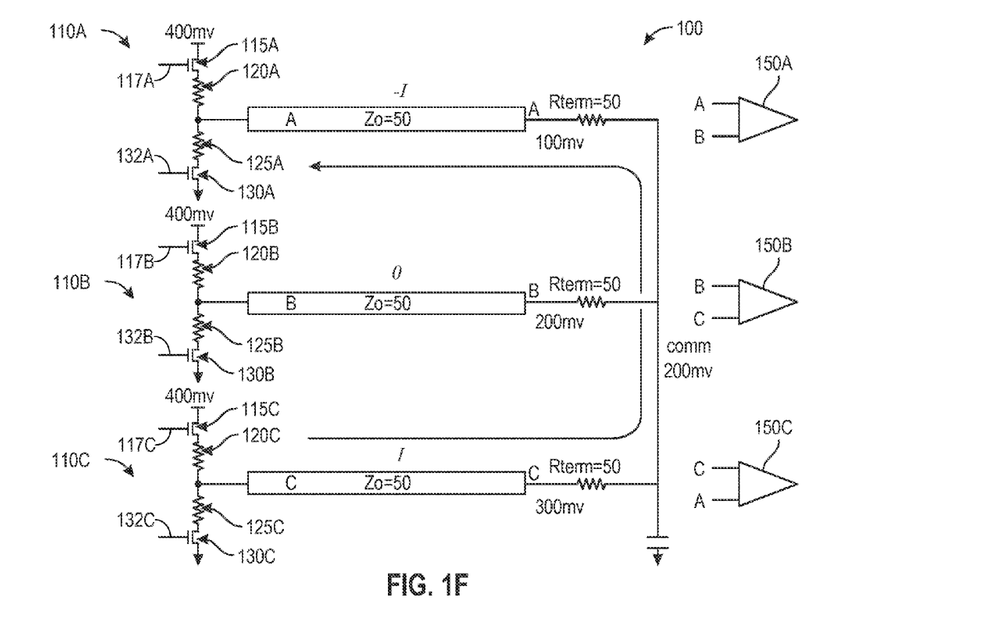

FIG. 1F shows a sixth state in which wires A and C are driven with wire B undriven, and wire C is positively driven and wire A is negatively driven. As a result, current flows from the transmitter side to the receiver side through wire C and returns to the transmitter side through wire A (represented by the current loop in FIG. 1F). Approximately no current flows through wire B.

The six possible states of the three wires A, B and C allow data bits at the transmitter side to be encoded into a plurality of symbols, where each symbol corresponds to one of the six states. With 6 states, $\log_2(6) \approx 2.585$ bits may be encoded per symbol. An encoder (not shown) at the transmitter side may encode bits into a plurality of symbols. For each symbol, the encoder may control the drivers 110A-110C to drive the three wires A, B and C into the corresponding state to transmit the symbol to the receiving side.

In one embodiment, the receiver side recovers a clock from received symbols by detecting state transitions between adjacent symbols, and uses the recovered clock to capture the received symbols. In order to produce a state transition between two adjacent symbols for clock recovery, the adjacent symbols need to have different states. Thus, from a current symbol, the next symbol may have any one of the five states that are different from the state of the current symbol. This reduces the number of possible states for each symbol from six states to five states. With 5 states, $\log_2(5) \approx 2.32$ bits may be encoded per symbol. Examples of encoding schemes that may be used to encode bits into symbols using the different available states of the three wires A, B and C are described in U.S. application Ser. No. 13/797,272, titled "N-Phase Polarity Data Transfer," filed on Mar. 12, 2013, the specification of which is incorporated herein by reference.

In one embodiment, a state (and hence symbol) is detected at the receiver side by detecting differential voltages between different pairs of the wires A, B and C. In this embodiment, the receiver side comprises a first receiver 150A having a positive input coupled to node A and a negative input coupled to node B, a second receiver 150B having a positive input coupled to node B and a negative input coupled to node C, and a third receiver 150C having a positive input coupled to node C and a negative input coupled to node A. Node A is between wire A and the respective termination resistor, node B is between wire B and the respective termination resistor, and node C is between wire C and the respective termination resistor. For ease of illustration, the connections between the receivers 150A-150C and the nodes A, B and C are not explicitly shown in FIGS. 1A-1F.

The first receiver 150A converts the sign of the differential voltage between nodes A and B, ΔVAB, into a bit. If ΔVAB is positive, the first receiver 150A outputs a one bit, and if ΔVAB is negative, the first receiver 150B outputs a zero bit. The second receiver 150B converts the sign of the differential voltage between nodes B and C, ΔVBC, into a bit. If ΔVBC is positive, the second receiver 150B outputs a one bit, and if ΔVBC is negative, the second receiver 150B outputs a zero bit. The third receiver 150C converts the sign of the differential voltage between nodes C and A, ΔVCA, into a bit. If ΔVCA is positive, the third receiver 150C outputs a one bit, and if ΔVCA is negative, the third receiver 150C outputs a zero bit. As discussed further below with reference to FIGS. 1A-1F, three output bits of the receivers 150A-150C provide a digital representation of a received symbol.

As discussed above, FIG. 1A shows a first state in which current flows from the transmitter side to the receiver side through wire A and returns to the transmitter side through wire B with no current flow through wire C. In the example shown in FIG. 1A, the power supply has a voltage of 400 mV and each resistor has an equal resistance (e.g., 50Ω). As a result, the voltage at node A is approximately 300 mV due to a voltage drop of 100 mV across the pull-up resistor 120A of the first driver 110A. The voltage at node B is approximately 100 mV due to a voltage drop of 200 mV across the two termination resistors between nodes A and B. The voltage at node C is approximately equal to the voltage at the common node (denoted comm) since no current flows through wire C and the respective termination resistor. The voltage at the common node is halfway between the voltages at nodes A and B, which is approximately 200 mV. Thus, in the first state, ΔVAB is 200 mV, ΔVBC is −100 mV, and ΔVCA is −100 mV. The output bits of the first, second and third receivers 150A-150C are 1, 0 and 0, respectively.

FIG. 1B shows a second state in which current flows from the transmitter side to the receiver side through wire B and returns to the transmitter side through wire A with no current flow through wire C. As a result, the voltage at node A is approximately 100 mV, the voltage at node B is approximately 300 mV, and the voltage at node C is approximately 200 mV. Thus, in the second state, ΔVAB is −200 mV, ΔVBC is 100 mV, and ΔVCA is 100 mV. The output bits of the first, second and third receivers 150A-150C are 0, 1 and 1, respectively.

FIG. 1C shows a third state in which current flows from the transmitter side to the receiver side through wire B and returns to the transmitter side through wire C with no current flow through wire A. As a result, the voltage at node A is approximately 200 mV, the voltage at node B is approximately 300 mV, and the voltage at node C is approximately 100 mV. Thus, in the third state, ΔVAB is −100 mV, ΔVBC is 200 mV, and ΔVCA is −100 mV. The output bits of the first, second and third receivers 150A-150C are 0, 1 and 0, respectively.

FIG. 1D shows a fourth state in which current flows from the transmitter side to the receiver side through wire C and returns to the transmitter side through wire B with no current flow through wire A. As a result, the voltage at node A is approximately 200 mV, the voltage at node B is approximately 100 mV, and the voltage at node C is approximately 300 mV. Thus, in the third state, ΔVAB is 100 mV, ΔVBC is −200 mV, and ΔVCA is 100 mV. The output bits of the first, second and third receivers 150A-150C are 1, 0 and 1, respectively.

FIG. 1E shows a fifth state in which current flows from the transmitter side to the receiver side through wire A and returns to the transmitter side through wire C with no current flow through wire B. As a result, the voltage at node A is approximately 300 mV, the voltage at node B is approximately 200 mV, and the voltage at node C is approximately 100 mV. Thus, in the third state, ΔVAB is 100 mV, ΔVBC is 100 mV, and ΔVCA is −200 mV. The output bits of the first, second and third receivers 150A-150C are 1, 1 and 0, respectively.

FIG. 1F shows a sixth state in which current flows from the transmitter side to the receiver side through wire C and returns to the transmitter side through wire A with no current flow through wire B. As a result, the voltage at node A is approximately 100 mV, the voltage at node B is approximately 200 mV, and the voltage at node C is approximately 300 mV. Thus, in the third state, ΔVAB is −100 mV, ΔVBC is −100 mV, and ΔVCA is 200 mV. The output bits of the first, second and third receivers 150A-150C are 0, 0 and 1, respectively.

Thus, in this example, the voltage at the node corresponding to the positively driven wire is approximately 300 mV, the voltage at the node corresponding to the negatively driven wire is approximately 100 mV, and the voltage at the node corresponding to the undriven wire is approximately 200 mV. It is to be appreciated that embodiments of the present disclosure are not limited to the above example, and that the power supply voltage may have other voltages and the resistors may have other resistances. Generally, the voltage at the node corresponding to the positively driven wire may be denoted V1, the voltage at the node corresponding to the negatively driven wire may be denoted V2 where V1 is greater than V2, and the voltage at the node corresponding to the undriven wire may be approximately (V1+V2)/2, assuming the resistors between the other two nodes have equal resistance.

Thus, each of the states shown in FIGS. 1A-1F produces a unique combination of output bits at the receivers 150A-150C. As a result, the output bits of the receivers 150A-150C can be used to distinguish between different states of the three wires A, B, and C, and therefore can be used to provide digital representations of received symbols. This allows a decoder (not shown) to recover the bits encoded in the symbols from the output bits of the receivers 150A-150C.

The communication system 100 may be used in various applications to provide communication between devices. For example, the communication system 100 may be used to communicate data, control and/or address signals between a circuit on a chip (e.g., a memory controller) and a memory device (e.g., a DRAM device). The communication system 100 is advantageously capable of transmitting more than twice as many bits per symbol than a conventional communication system that uses a single pair of differential wires at a cost of one additional wire and one additional driver. It is to be appreciated that the communication system 100 is not limited to 3 wires and may comprise more wires to increase the number of possible states and therefore increase throughput. For example, the communication system may comprise 6 wires, in which two pairs of wires are driven and two wires are undriven for each state.

Figure 2:
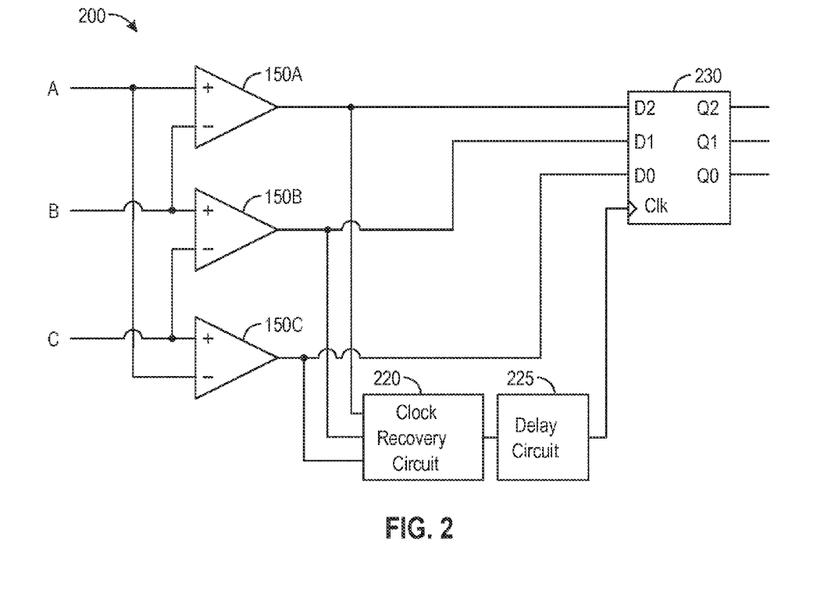
FIG. 2 shows a receiver-side system according to one embodiment of the present disclosure.

FIG. 2 shows a receiver-side system 200 for capturing output bits of the receivers 150A-150C according to one embodiment. The system 200 comprises a flip-flop 230, a clock recovery circuit 220, and a delay circuit 225. The clock recovery circuit 220 is configured to generate a clock by detecting transitions in the receiver outputs. For example, for each symbol, the clock recovery circuit 220 may be configured to detect the earliest transition (1 to 0 or 0 to 1) in the receiver outputs for the symbol, and generate a clock pulse with a rising edge approximately aligned with the detected transition. The delay circuit 225 is configured to delay the clock from the clock recovery circuit 220, and output the delayed clock to the clock input of the flip-flop 230. The flip-flop 230 is configured to capture receiver output bits on each rising edge of the delayed clock, and output the captured bits to the decoder (not shown). Although the flip-flop 230 is depicted as one flip-flop in FIG. 2 for ease of illustration, it is to be appreciated that the flip-flop 230 may comprise three flip-flops, one for each receiver output. In order for the flip-flop 230 to reliably capture receiver output bits, the delayed clock needs to satisfy certain timing requirements, as discussed further below with reference to FIGS. 3 and 4.

Figure 3:
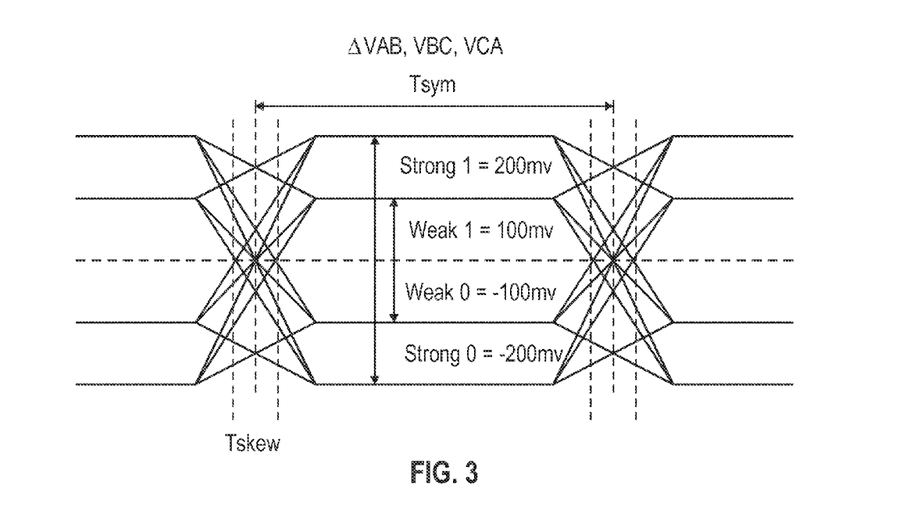
FIG. 3 shows an example of differential voltage transitions according to an embodiment of the present disclosure.

FIG. 3 is a timing diagram showing different transitions that are possible for each of the differential voltages ΔVAB, ΔVBC and ΔVCB. Each differential voltage has four possible voltage levels: −200 mV, −100 mV, 100 mV and 200 mV. Each time the three wires A, B and C transition between states (symbols), each of the differential voltages may transition from any one of the four voltage levels to any one of the other voltage levels, as shown in FIG. 3.

The output of each receiver 150A-150C makes a transition (1 to 0 or 0 to 1) when the respective differential voltage crosses the zero-voltage point (depicted as a dotted line in FIG. 3). As shown in FIG. 3, not every possible differential voltage transition crosses the zero-voltage point, and therefore not every differential voltage transition results in a transition of the respective receiver output. However, each transition in the state of the three wires A, B and C (each symbol transition) results in a transition of at least one of the three outputs of the receivers 150A-150C.

For the differential voltage transitions that cross the zero-voltage point, the timing of the zero-voltage crossings varies. For example, a differential voltage transition from −100 mV to 200 mV crosses the zero-voltage point earlier than a differential voltage transition from −100 mV to 100 mV, and therefore causes the respective receiver output to transition from 0 to 1 earlier. The timing variations in the zero-voltage crossings result in uncertainty in the timing of transitions of the receiver outputs. In FIG. 3, the amount of uncertainty in the timing of transitions of the receiver outputs is represented by a time interval referred to as Tskew. Tskew may be bounded by the earliest possible transition of a receiver output and the latest possible transition of a receiver output for a given symbol, as shown in the example in FIG. 3

Figure 4:
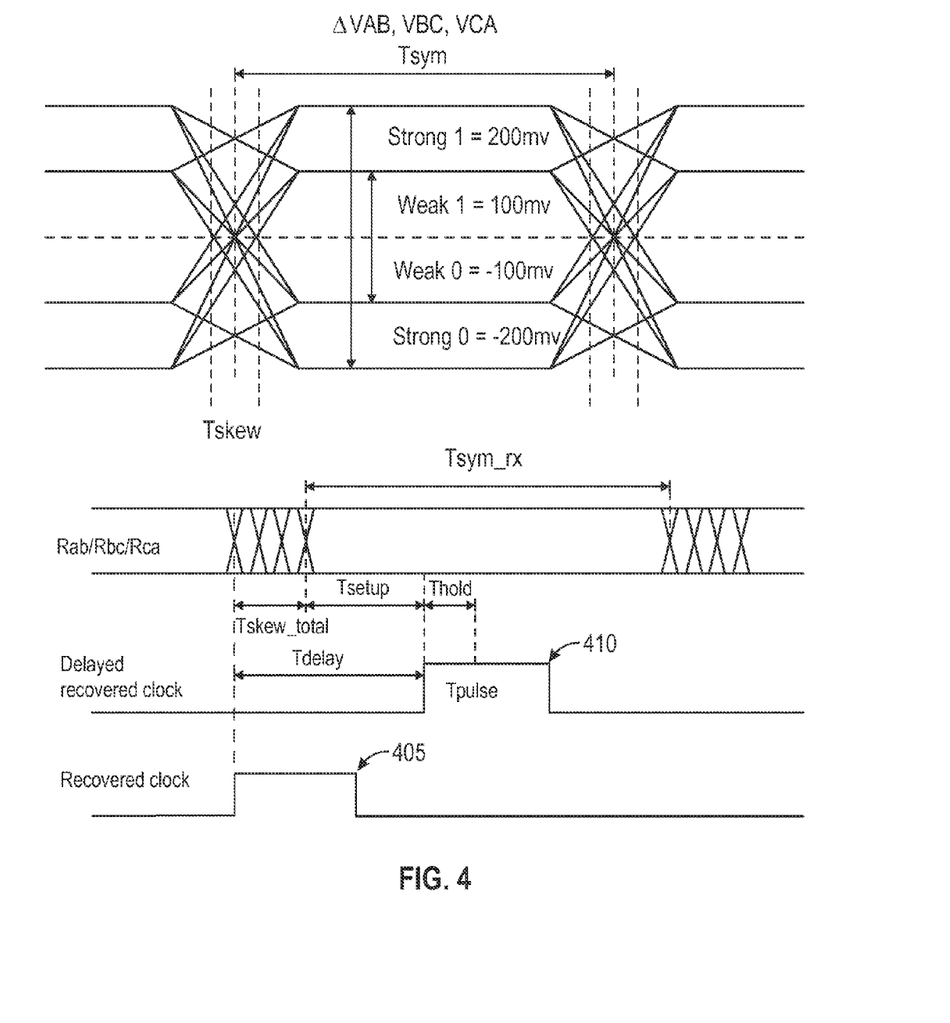
FIG. 4 is a timing diagram illustrating capture of receiver output bits for a symbol according to an embodiment of the present disclosure.

FIG. 4 is a timing diagram illustrating capture of receiver output bits for a symbol according to one embodiment. In this example, the clock recovery circuit 220 is configured to detect the earliest transition of the receiver outputs for the symbol, and generate a clock pulse 405 with a rising edge approximately aligned with the detected transition. For timing analysis purposes, the earliest transition is assumed to be aligned with the leftmost boundary of Tskew. The clock pulse 405 is then delayed by the delay circuit 225 by a time delay Tdelay to become clock pulse 410, as shown in FIG. 4. The flip-flop 230 captures the receiver output bits for the symbol at approximately the rising edge of the delayed clock pulse 410.

In this example, Tdelay is equal to or greater than the sum of Tskew_total and the setup time (denoted Tsetup) of the flip-flop 230. Tskew_total is the sum of Tskew in FIG. 3 and skew due to channel conditions of the wires. The clock pulse 410 is delayed by Tskew_total to provide a timing margin that accounts for the uncertainty in the transitions of the receiver outputs discussed above. For example, one of the receiver outputs may transition earlier than another one of the receiver outputs within Tskew_total. The clock pulse 410 is further delayed by Tsetup to satisfy the setup-time requirement of the flip-flop 230.

The width of the clock pulse 410 (denoted Tpulse) is equal to or greater than the minimum pulse width requirement (denoted Tmin_pulse) of the flip-flop 230. The time remaining within Tsym_rx after the rising edge of the clock pulse 410 needs to be greater than the hold time (denoted Thold) of the flip-flop 230 to satisfy the hold time requirement of the flip-flop 230. Tsym_rx is equal to Tsym−Tskew_total, where Tsym is the symbol period including skew. Thus, Tsym_rx needs to be at least equal to the sum of Tsetup and the maximum of Thold or Tpulse.

Process-voltage-temperature (PVT) variations in the delay circuit 225 can cause wide variations in Tdelay. For example, process variations can have a large impact on Tdelay. If the delay circuit 225 is fabricated with fast transistors (e.g., fast process corner), then Tdelay may be shorter, and if the delay circuit 225 is fabricated with slow transistors (e.g., slow process corner), then Tdelay may be longer. Also, PVT variations in the flip-flop 230 can cause variations in Tsetup. As a result, additional timing margins need to be budgeted into the symbol time period Tsym_rx to account for variations in Tdelay and Tsetup. This increases the symbol time period Tsym_rx, which reduces the data rate.

Figure 5:
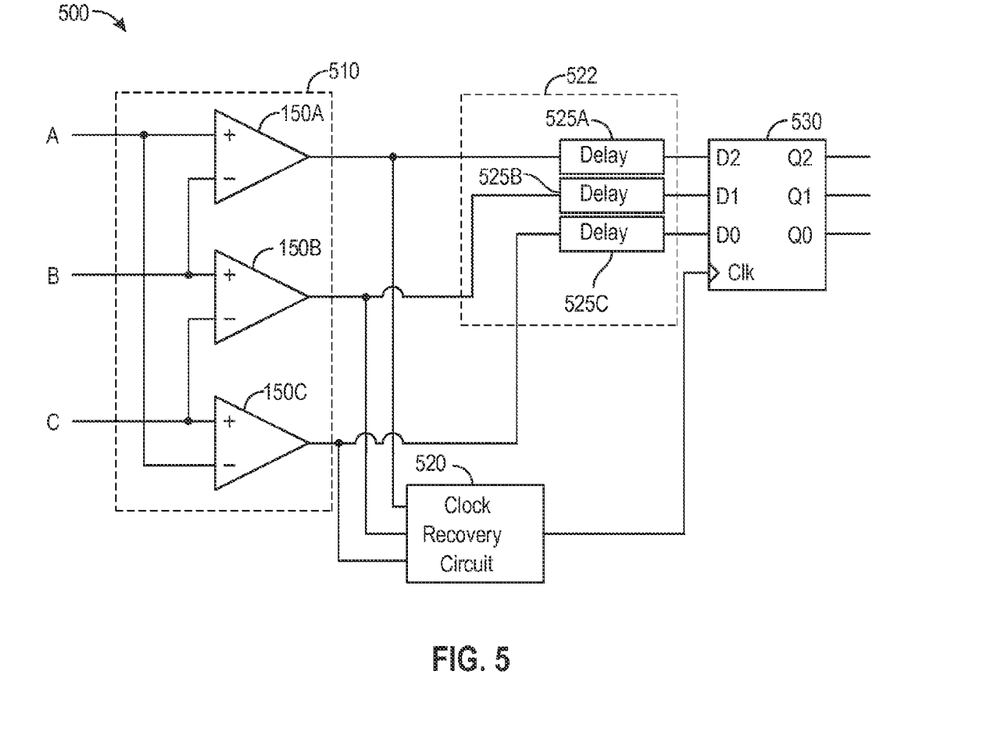
FIG. 5 shows a receiver-side system according to another embodiment of the present disclosure.

FIG. 5 shows a receiver-side system 500 for capturing output bits of the receivers 150A-150C according to another embodiment of the present disclosure. The system 500 detects transitions in the receiver outputs to generate a clock, same as before. However, the system 500 delays the receiver outputs so that a clock edge that is generated from a transition of the receiver outputs to a current symbol (symbol N) is used to capture (sample) the receiver output bits for the previous symbol (symbol N−1), as discussed further below.

The receiver-side system 500 comprises the receivers 150A-150C coupled to wires A-C, as discussed above. The receivers 150A-150C may collectively be considered a receiver circuit 510, as shown in FIG. 5. The receiver-side system 500 also comprises a flip-flop 530, a clock recovery circuit 520, and a delay circuit 522. The delay circuit 522 may further comprise three delay circuits 525A-525C, where each delay circuit 525A-525C is coupled to the output of a respective one of the receivers 150A-150C, as shown in FIG. 5. The clock recovery circuit 520 is configured to generate a clock by detecting transitions in the outputs of the receivers 150A-150C. For example, for each symbol, the clock recovery circuit 520 may be configured to detect the earliest transition in the receiver outputs for the symbol, and generate a clock pulse with a rising edge approximately aligned with the detected transition.

Each of the delay circuits 525A-525C is configured to delay the respective one of the receiver outputs, and output the delayed receiver output to the corresponding data input of the flip-flop 530. The flip-flop 530 is configured to capture delayed receiver output bits on each rising edge of the clock, and output the captured bits to the decoder (not shown).

In one embodiment, the delay circuits 525A-525C are configured to delay the receiver outputs by a time delay approximately equal to the sum of the hold time of the flip-flop 530 and t1, where t1 is approximately equal to the time it takes for the clock recovery circuit 520 to output a clock edge after detecting a transition in the receiver outputs. The delay circuits 525A-525C delay the receiver outputs so that a clock edge that is generated from a transition of the receiver outputs to a current symbol (symbol N) is used by the flip-flop 530 to capture (sample) the receiver output bits for the previous symbol (symbol N−1), as discussed further below.

Figure 6:
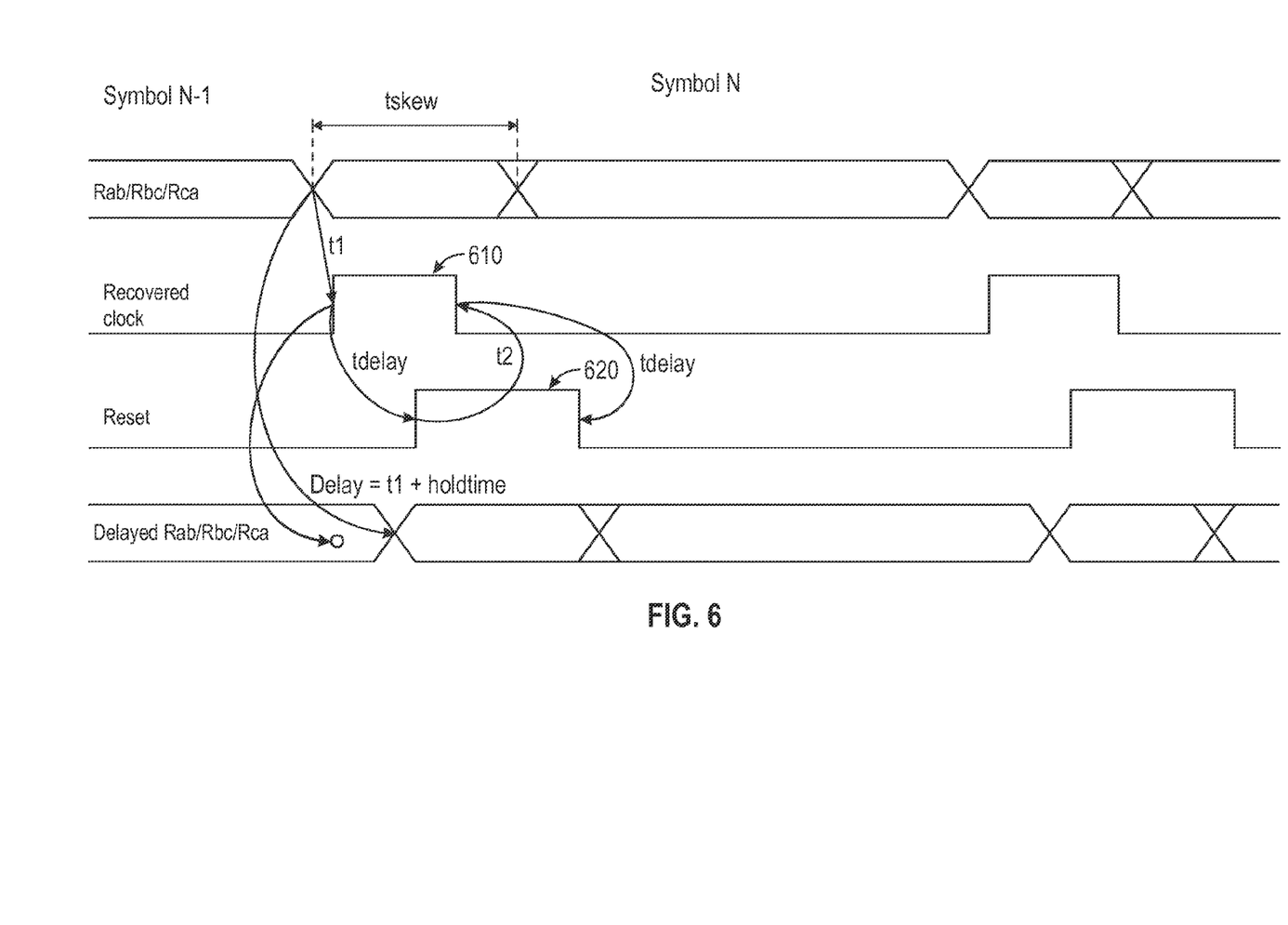
FIG. 6 is a timing diagram illustrating capture of receiver output bits for a symbol according to another embodiment of the present disclosure.

FIG. 6 is a timing diagram illustrating capture of receiver output bits (denoted Rac/Rab/Rac) in the receiver-side system 500 according to one embodiment. In this example, the clock recovery circuit 520 detects the earliest transition of the receiver outputs to a current symbol (symbol N), and generates a clock pulse 610 with a rising edge approximately aligned with the detected transition. For timing analysis purposes, the earliest transition is assumed to be aligned with the leftmost boundary of tskew. As shown in FIG. 6, there is a short delay t1 between the time that the earliest transition is detected and the rising edge of the clock pulse 610 due to propagation delays in the clock recovery circuit 520.

The delay circuits 525A-525C delay the receiver outputs by a time delay approximately equal to the sum of the hold time of the flip-flop 530 and t1. Because of the delay of the receiver outputs, the flip-flop 530 still receives the receiver output bits for the previous symbol (symbol N−1) when the flip-flop 530 receives the rising edge of the clock pulse 610 generated from the detected transition of the receiver outputs for the current symbol (symbol N). As a result, the flip-flop 530 captures the receiver output bits for the previous symbol (symbol N−1) using the clock edge generated from the transition of the receiver outputs to the current symbol (symbol N). The point at which the receiver output bits for the previous symbol (N−1) are sampled is represented by an open circle in FIG. 6.

Delaying the receiver outputs by the hold time of the flip-flop 530 helps ensure that the receiver output bits for the previous symbol (symbol N−1) satisfy the hold time requirement of the flip-flop 530, and are therefore reliably captured by the flip-flop 530. Delaying the receiver outputs by t1 accounts for the short delay in generating the clock pulse 610 at the clock recovery circuit 520.

The hold time of the flip-flop 530 is typically much smaller than the setup time and tskew. As a result, the delay of the receiver outputs can be substantially smaller than the clock delay in the previous embodiment. This substantially reduces delay variations due to PVT, and therefore reduces the timing margins that need to be budgeted into the symbol time period Tsym_rx. The reduced timing margins allow the symbol time period Tsym_rx to be shorter to achieve higher data rates.

Figure 7:
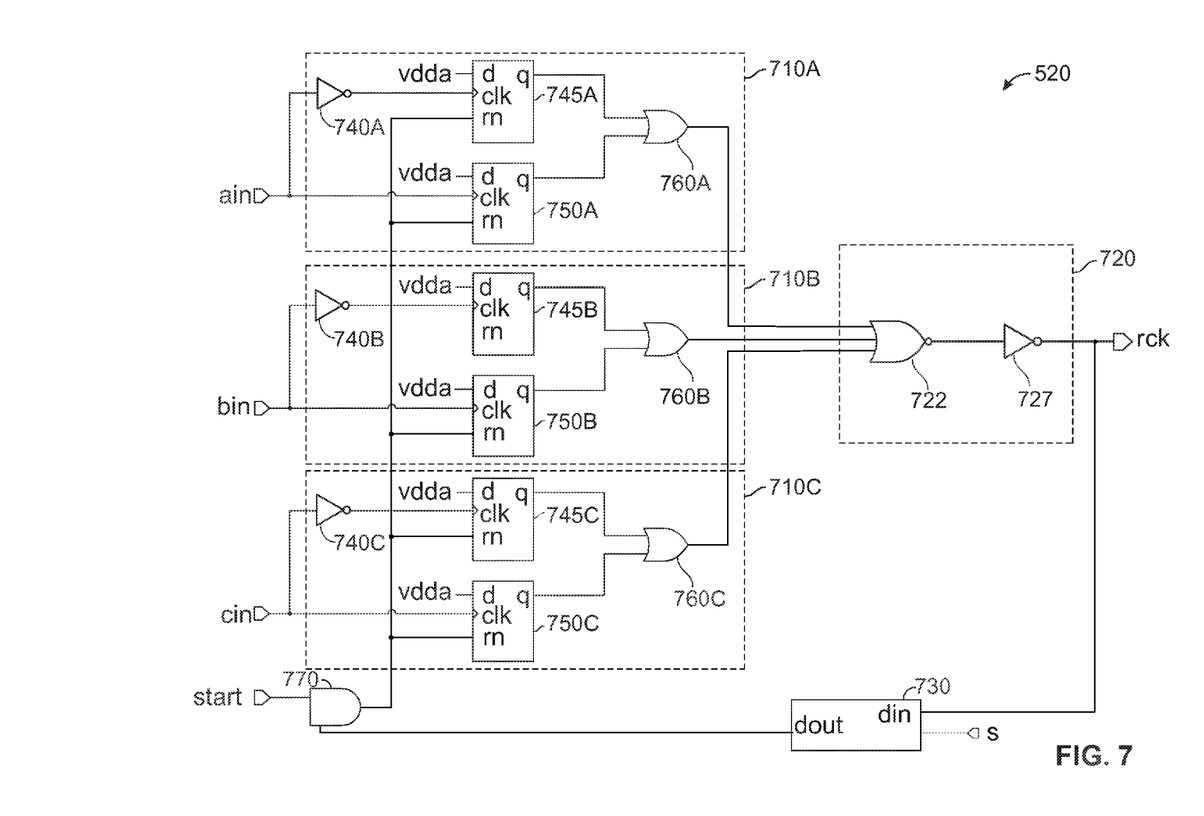
FIG. 7 shows an exemplary implementation of a clock recovery circuit according to an embodiment of the present disclosure.

FIG. 7 shows the clock recovery circuit 520 according to an embodiment of the present disclosure. The clock recovery circuit 520 comprises a first edge-detection circuit 710A coupled to the output of the first receiver 150A, a second edge-detection circuit 710B coupled to the output of the second receiver 150B, and a third edge-detection circuit 710C coupled to the output of the third receiver 150C. The clock recovery circuit 520 also comprises an OR gate 720 and a delay circuit 730. In the example shown in FIG. 7, the OR gate 720 is implemented with a NOR gate 722 coupled in series with an inverter 727.

Each edge-detection circuit 710A-710C comprises a first flip-flop 750A-750C, a second flip-flop 745A-745C, an inverter 740A-740C, and an OR gate 760A-760C. The first flip-flop 750A-750C has a clock input coupled to the output of the respective receiver 150A-150C and a data input coupled to the power supply voltage vdda. The first flip-flop 750A-750C is configured to output a 1 to one of the inputs of the OR gate 760A-760C when a rising signal edge is detected at the clock input. As a result, the first-flop 750A-750C detects a rising transition (0 to 1) in the respective receiver output, and outputs a 1 when a rising transition is detected. The second flip-flop 745A-745C has a clock input coupled to the output of the respective receiver 150A-150C through the inverter 740A-740C and a data input coupled to the power supply voltage vdda. The second flip-flop 745A-745C is configured to output a 1 to the other input of the OR gate 760A-760C when a rising signal edge is detected at the clock input. Because the inverter 740A-740C inverts the receiver output, the second flip-flop 745A-745C detects a falling transition (1 to 0) in the receiver output, and outputs a 1 to the other input of the OR gate 760A-760C when a falling transition is detected. The OR gate 760A-760C outputs a 1 when either the first flip-flop 750A-750C or the second flip-flop 745A-745C outputs a 1, and therefore outputs a 1 when either a rising or falling transition in the respective receiver output is detected. Thus, each edge-detection circuit 710A-710C outputs a 1 when a transition (rising or falling transition) is detected in the respective receiver output.

The OR gate 720 gate has a first input coupled to the output of the first edge-detection circuit 710A, a second input coupled to the output of the second edge-detection circuit 710B, and a third input coupled to the output of the third edge-detection circuit 710C. As a result, the OR gate 720 outputs a 1 when any one of the edge-detection circuits 710A-710C outputs a 1, and therefore outputs a 1 when any one of the edge detection circuits 710A-710C detects a transition in the respective receiver output.

Assuming that the flip-flops in the edge-detection circuits 710A-710C are reset before each symbol, the OR gate 720 initially outputs a 0 at the start of each symbol. When a first one of the edge-detection circuits 710A-710C detects a transition in the respective receiver output and outputs a 1 to the OR gate 720, the OR gate 720 outputs a 1, generating a clock pulse 610 at the output (denoted rck) of the clock recovery circuit 520. The transition of the output of the OR gate 720 from 0 to 1 corresponds to the rising edge of the clock pulse 610. There is a short time delay t1 between detection of the first (earliest) transition in the receiver outputs and the rising edge of the clock pulse 610 due to propagation delays in the flip-flops and OR gates. This time delay is depicted in FIG. 6 by the arrow labeled t1.

The output of the clock recovery circuit 520 is fed back to the reset inputs of the flip-flops 745A-745C and 750A-750C through the delay circuit 730. When the output of the OR gate 720 transition from 0 to 1 (rising clock edge), the delay circuit 730 outputs a reset signal 620 to the reset inputs of the flip-flops after a time delay of tdelay. This delay is depicted in FIG. 6 by the arrow labeled tdelay from the rising edge of the clock pulse 610 to the start of the reset signal 620. The reset signal 620 causes all of the flip-flops to output a 0. As a result, after a short delay t2, the output of the OR gate 720 transitions from 1 to 0. The transition from 1 to 0 corresponds to the falling edge of the clock pulse 610. Thus, the width of the clock pulse is approximately equal to the sum of tdelay and t2, as shown in FIG. 6.

When the output of the OR gate transitions from 1 to 0, the delay circuit 730 ends the reset signal 620 to the reset inputs of the flip-flops after the time delay tdelay of the delay circuit 730. This time delay is depicted in FIG. 6 by the arrow labeled tdelay from the falling edge of the clock pulse 610 to the end of the reset signal 620. After the reset signal 620 ends, the flip-flops are ready to detect a transition in the receiver outputs for the next symbol.

In one aspect, the clock recovery circuit 520 meets the following timing constraint:

$$t\text{skew} < t1 + t\text{delay} + t2 + t\text{delay}.$$

This constraint helps ensure that the reset signal 620 ends after tskew for the current symbol. If the reset signal 620 ended before tskew for the current symbol, then a transition in the receiver outputs occurring between the end of the reset signal 620 and the end of tskew may cause the recovery clock circuit 520 to generate a second clock pulse for the current symbol, causing the flip-flop 530 to be triggered twice in one symbol period. Assuming that t1 and t2 are small relative to tskew, this timing constraint can be meet by setting the time delay tdelay of the delay circuit 730 to be approximately equal to or greater than ½*tskew. In this aspect, tskew may include skew due to channel conditions. The delay circuit 730 may be implemented with a plurality of inverters or other type of delay elements coupled in series.

In one embodiment, the clock recovery circuit also comprises an AND gate 770 having one input coupled to a start signal and another input coupled to the delay circuit 730, and an output coupled to the reset inputs of the flip-flops. The AND gate 770 passes the output of the delay circuit 730 to the reset inputs of the flip-flops when the start signal is 1 and blocks the output of the delay circuit 730 to the reset inputs of the flip-flops when the start signal is 0. The start signal may be set to 0 to disable the clock recovery circuit 520 when the clock recovery circuit 520 is not in use to conserve power.

Figure 8:
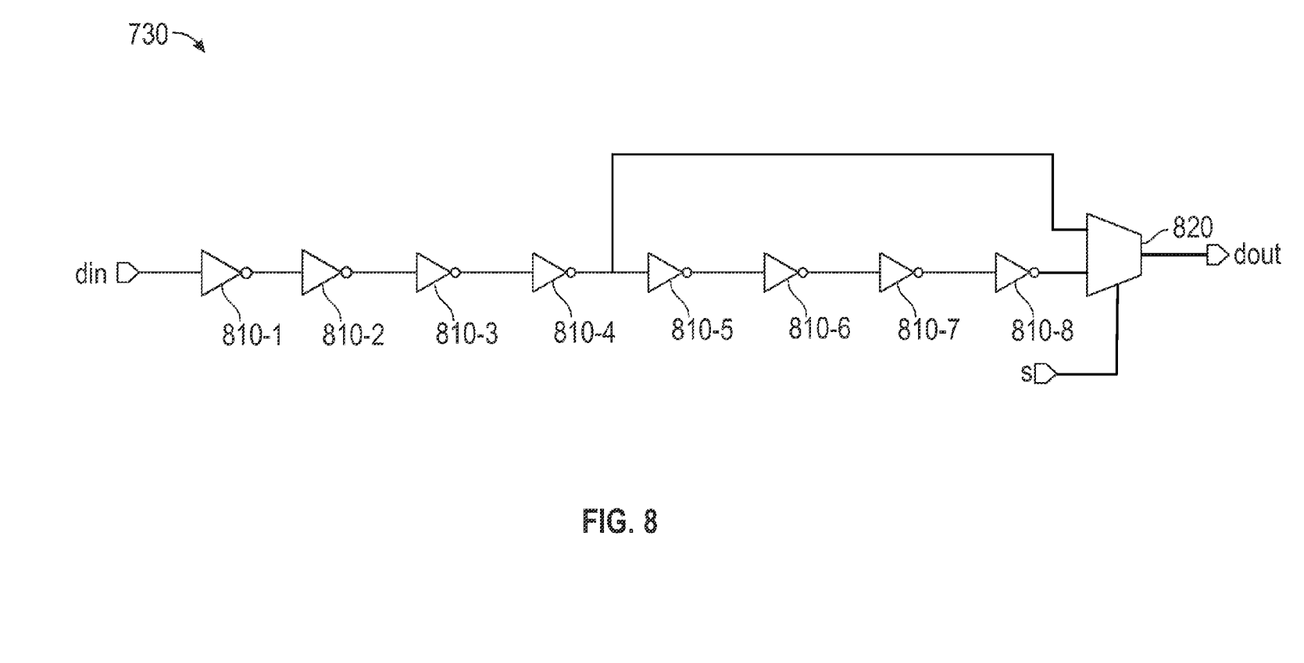
FIG. 8 shows an exemplary implementation of a delay circuit in the clock recovery circuit according to an embodiment of the present disclosure.

FIG. 8 shows an exemplary implementation of the delay circuit 730 according to an embodiment of the present disclosure. In this embodiment, the delay circuit 730 comprises a plurality of inverters 810-1 to 810-8 coupled in series into a delay chain, and a multiplexer 820. The multiplexer 820 has a first input coupled to the output of the fourth inverter 810-4 in the delay chain and a second input coupled to the output of the last inverter 810-8 in the delay chain. The multiplexer 820 selectively couples either the output of the fourth inverter 810-4 or the output of the last inverter 810-8 to the output of the delay circuit 730 under the control of a selection signal (denoted s). This allows the time delay (tdelay) of the delay circuit 730 to be adjusted. For example, the output of the fourth inverter 810-4 may be selected to make tdelay shorter and the output of the last inverter 810-8 may be selected to make tdelay longer. As discussed above, tdelay may be set to be approximately equal to or greater than ½*tskew. Thus, tdelay may be adjusted according to changes in tskew. To provide greater granularity in the adjustment of tdelay, the multiplexer 820 may have additional inputs coupled to the outputs of other inverters in the delay chain to allow the outputs of the other inverters to be selected.

In one embodiment, the multiplexer 820 may be an inverting multiplexer 820. As a result, the output (dout) of the delay circuit 730 may be inverted with respect to the input (din). In this embodiment, the reset signal output from the delay circuit 730 may have the opposite polarity of the reset signal shown in FIG. 6, and each of the flip flops 745A-745A and 750A-750C may have an inverting reset input (rn).

Figure 9:
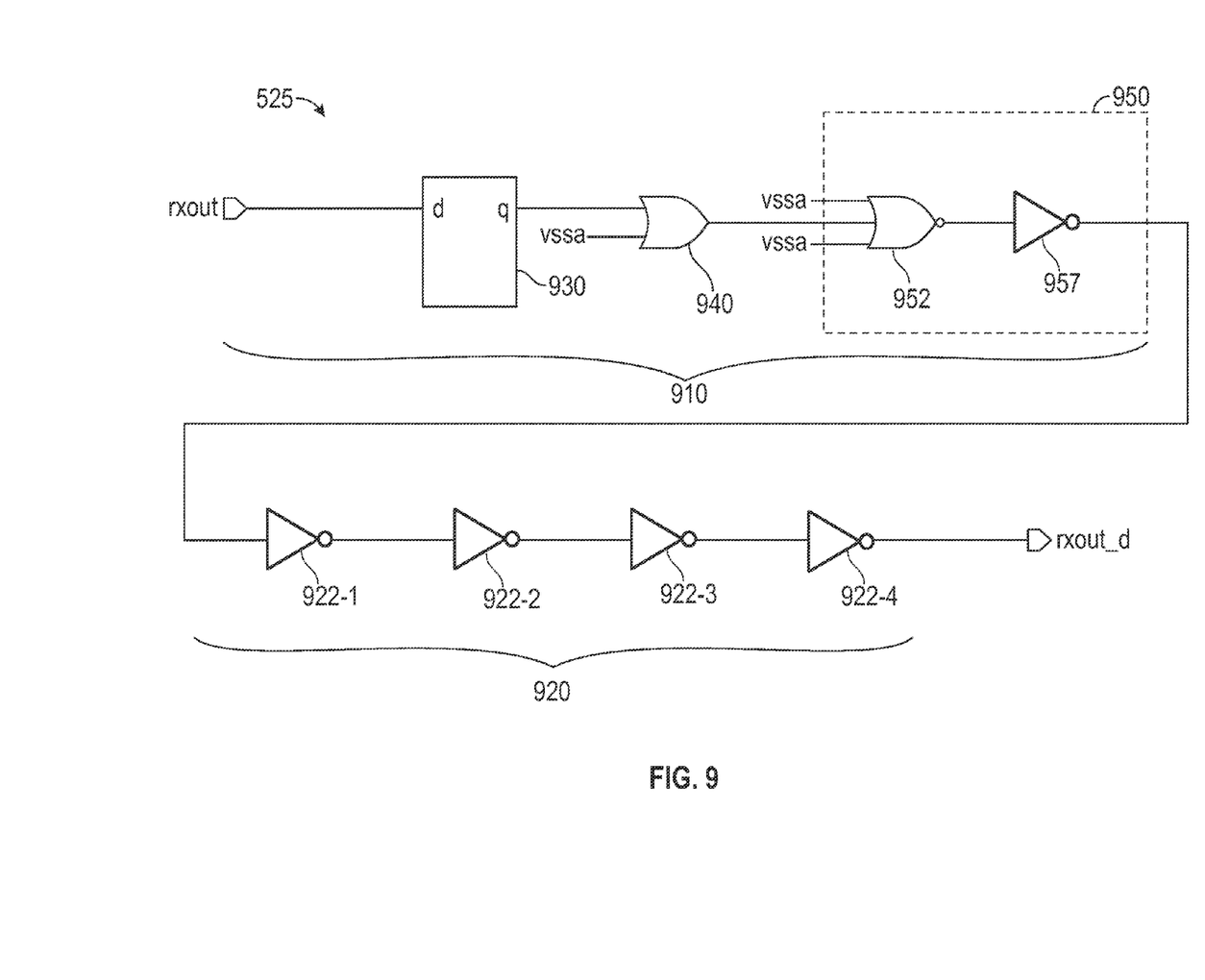
FIG. 9 shows an exemplary implementation of a delay circuit according to an embodiment of the present disclosure.

FIG. 9 shows an exemplary implementation of one of the delay circuits 525A-525C according to an embodiment of the present disclosure. Each one of the delay circuits 525A-525C may be implemented using the delay circuit 525 shown in FIG. 9. In this example, the delay circuit 525 comprises a first portion 910 for providing the delay for t1 discussed above and a second portion 920 for providing the delay for the hold time discussed above. Thus, the total delay is approximately equal to the sum of t1 and the hold time. The first portion 910 is implemented with components that are the same or similar to components in the clock recovery circuit 520. This is done so that the delay in the first portion 910 of the delay circuit 525 closely matches t1, which is the delay from the time that the clock recovery circuit 520 detects a transition in the receiver outputs and the time that the clock recovery circuit 520 outputs the corresponding clock edge.

The first portion 910 of the delay circuit 525 comprises a delay circuit 930, a first OR gate 940 and a second OR gate 950. The delay circuit 930 mimics the clock to Q delay in one of the flip-flops 745A-745C and 750A-750C in the clock recovery circuit 520. For example, the delay circuit 930 may include inverters mimicking inverters in latches (e.g., master latch and slave latch) of the flip-flop. The delay circuit 930 is illustrated as a flip-flop in FIG. 9 to convey that the delay circuit 930 mimics the flop delay in the clock recovery circuit, although it is to be appreciated that the delay circuit 930 is not strictly a flip-flop.

The first OR gate 940 mimics the delay in one of the OR gates 760A-760C in the clock recovery circuit 520. The first OR gate 940 has two inputs, in which one of the inputs is coupled to the signal path of the delay circuit 525 and the other input is coupled to voltage vssa (logic 0). The second OR gate 950 mimics the delay in the OR gate 720 of the clock recovery circuit 520. In this regard, the second OR gate 950 may be implemented with a NOR gate 952 and an inverter 957 coupled in series, in which the NOR gate 952 and the inverter 957 correspond to the NOR gate 722 and the inverter 727, respectively, used to implement the OR gate 720. The NOR gate 952 has three inputs, in which one of the inputs is coupled to the signal path of the delay circuit 525 and other two inputs are coupled to voltage vssa (logic 0).

The components in the first portion 910 of the delay circuit 525 may be fabricated close to the corresponding components in the clock recovery circuit 520 so that the components in both are subject to approximately the same PVT variations. This allows the first portion of the 910 of the delay circuit 525 to closely match t1. The second portion 920 of the delay circuit 525 may be implemented with a plurality of inverters 922-1 to 922-4 coupled in series, as shown in the example in FIG. 9.

Figure 10:
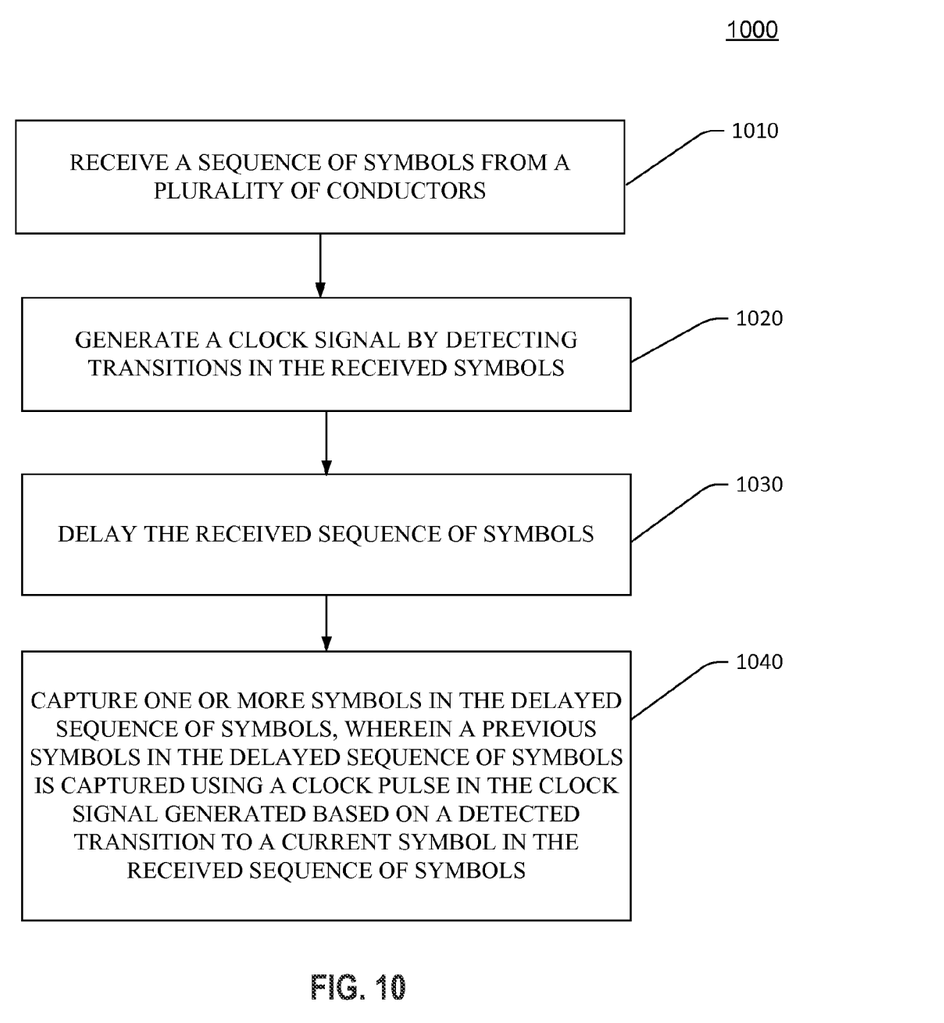
FIG. 10 is a flowchart illustrating a method for receiving data according to an embodiment of the present disclosure.

FIG. 10 is a flowchart illustrating a method 1000 for receiving data according to an embodiment of the present disclosure. The method 1000 may be performed, for example, by the receiver-side system 500 shown in FIG. 5.

In step 1010, a sequence of symbols is received from a plurality of conductors. For example, the sequence of symbols may be received by receivers (e.g., receivers 150A-150C) coupled to the plurality of conductors (e.g., wires A-C).

In step 1020, a clock signal is generated by detecting transitions in the received sequence of symbols. For example, the clock signal may be generated by a clock recover circuit (e.g., clock recovery circuit 520) that converts the detected transitions into rising edges of the clock signal.

In step 1030, the received sequence of symbols is delayed. For example, the received sequence of symbols may be delayed by delay circuits (e.g., delay circuits 525A-525C) coupled to the outputs of the receivers (e.g., 150A-150C).

In step 1040, one or more symbols in the delayed sequence of symbols are captured using the clock signal, wherein a previous symbol in the delayed sequence of symbols is captured using a clock pulse in the clock signal generated based on a detected transition to a current symbol in the received sequence of symbols. For example, the one or more symbols may be captured with a flip flop (e.g., flip flop 530). The delay of the delayed sequence of symbols may be approximately equal to or greater than a sum of a hold time of the flip-flop (e.g., flip flop 530) and a time delay (e.g., delay t1) between a detected transition and a corresponding edge of the clock signal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A method for receiving data, comprising:
    receiving a sequence of symbols from a plurality of conductors;
    generating a clock signal by detecting transitions in the received sequence of symbols;
    delaying the received sequence of symbols; and
    capturing one or more symbols in the delayed sequence of symbols using the clock signal, wherein a previous symbol in the delayed sequence of symbols is captured using a clock pulse in the clock signal generated based on a detected transition from the previous symbol to a current symbol in the received sequence of symbols.

2. The method of claim 1, wherein capturing the delayed sequence of symbols comprises capturing the delayed sequence of symbols with a flip-flop.

3. The method of claim 2, wherein the received sequence of symbols is delayed by a time delay approximately equal to or greater than a hold time of the flip-flop.

4. The method of claim 3, wherein the time delay is less than a setup time of the flip-flop.

5. The method of claim 2, wherein the received sequence of symbols is delayed by a time delay approximately equal to or greater than a sum of a hold time of the flip-flop and a time delay between a detected transition and a corresponding edge of the clock signal.

6. The method of claim 1, wherein each symbol is sent across the plurality of conductors by driving at least one pair of the conductors and leaving at least one of the conductors undriven.

7. The method of claim 6, wherein the at least one pair of conductors are driven with opposite polarity.

8. The method of claim 6, wherein receiving the sequence of symbols comprises converting each symbol into a plurality of bits, and wherein capturing the delayed sequence of symbols comprises capturing the plurality of bits for the previous symbol in the delayed sequence of symbols using the clock pulse generated based on the detected transition from the previous symbol to the current symbol in the received sequence of symbols.

9. The method of claim 8, wherein converting each symbol into a plurality of bits comprises detecting a plurality of differential voltages across different pairs of the conductors, and generating the bits based on the detected differential voltages.

10. An apparatus for receiving data, comprising:
    means for receiving a sequence of symbols from a plurality of conductors;
    means for generating a clock signal by detecting transitions in the received sequence of symbols;
    means for delaying the received sequence of symbols; and
    means for capturing one or more symbols in the delayed sequence of symbols using the clock signal, wherein a previous symbol in the delayed sequence of symbols is captured using a clock pulse in the clock signal generated based on a detected transition from the previous symbol to a current symbol in the received sequence of symbols.

11. The apparatus of claim 10, wherein the received sequence of symbols is delayed by a time delay approximately equal to or greater than a hold time of the means for capturing the delayed sequence of symbols.

12. The apparatus of claim 11, wherein the time delay is less than a setup time of the means for capturing the delayed sequence of symbols.

13. The apparatus of claim 10, wherein the received sequence of symbols is delayed by a time delay approximately equal to or greater than a sum of a hold time of the means for capturing the delayed sequence of symbols and a time delay of the means for generating the clock signal.

14. The apparatus of claim 10, wherein each symbol is sent across the plurality of conductors by driving at least one pair of the conductors and leaving at least one of the conductors undriven.

15. The apparatus of claim 14, wherein the at least one pair of conductors are driven with opposite polarity.

16. The apparatus of claim 14, wherein the means for receiving the sequence of symbols comprises means for converting each symbol into a plurality of bits, and wherein the means for capturing the delayed sequence of symbols comprises means for capturing the plurality of bits for the previous symbol in the delayed sequence of symbols using the clock pulse generated based on the detected transition to the current symbol in the received sequence of symbols.

17. The apparatus of claim 16, wherein the means for converting each symbol into a plurality of bits comprises means for detecting a plurality of differential voltages across different pairs of the conductors, and means for generating the bits based on the detected differential voltages.

18. A receiving apparatus, comprising:
    a receiver circuit configured to receive a sequence of symbols from a plurality of conductors;
    a clock recovery circuit configured to generate a clock signal by detecting transitions in the received sequence of symbols;
    a delay circuit configured to delay the received sequence of symbols; and
    a flip-flop configured to capture one or more symbols in the delayed sequence of symbols using the clock signal, wherein the flip-flop captures a previous symbol in the delayed sequence of symbols using a clock pulse in the clock signal generated based on a detected transition from the previous symbol to a current symbol in the received sequence of symbols.

19. The apparatus of claim 18, wherein the delay circuit is configured to delay the received sequence of symbols by a time delay approximately equal to or greater than a hold time of the flip-flop.

20. The apparatus of claim 19, wherein the time delay is less than a setup time of the flip-flop.

21. The apparatus of claim 19, wherein the received sequence of symbols is delayed by a time delay approximately equal to or greater than a sum of a hold time of the flip-flop and a time delay required by the clock recovery circuit to convert a detected transition into a correspond edge of the clock signal.

22. The apparatus of claim 18, wherein each symbol is sent across the plurality of conductors by driving at least one pair of the conductors and leaving at least one of the conductors undriven.

23. The apparatus of claim 22, wherein the at least one pair of conductors are driven with opposite polarity.

24. The apparatus of claim 22, wherein the receiver circuit is configured to convert each symbol into a plurality of bits, and the flip-flop is configured to capture the plurality of bits for the previous symbol in the delayed sequence of symbols using the clock pulse generated based on the detected transition to the current symbol in the received sequence of symbols.

25. The apparatus of claim 24, wherein the receiver circuit is configured to convert each symbol into a plurality of bits by detecting a plurality of differential voltages across different pairs of the conductors, and generating the bits based on the detected differential voltages.

\* \* \* \* \*